United States Patent
Yang

(10) Patent No.: US 10,823,591 B2
(45) Date of Patent: Nov. 3, 2020

(54) CONTROL SYSTEM FOR APPLICATION OF LIQUID OR SOLID MATERIAL

(71) Applicant: DEERE & COMPANY, Moline, IL (US)

(72) Inventor: Xinzhan Z. Yang, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 668 days.

(21) Appl. No.: 14/627,227

(22) Filed: Feb. 20, 2015

(65) Prior Publication Data
US 2016/0245678 A1 Aug. 25, 2016

(51) Int. Cl.
| | | |
|---|---|---|
| *G01F 1/00* | (2006.01) | |
| *G01F 23/00* | (2006.01) | |
| *A01C 23/00* | (2006.01) | |
| *A01M 7/00* | (2006.01) | |
| *A01M 9/00* | (2006.01) | |
| *A01C 7/06* | (2006.01) | |
| *A01C 21/00* | (2006.01) | |
| *A01C 15/00* | (2006.01) | |

(52) U.S. Cl.
CPC ............... *G01F 1/00* (2013.01); *A01C 7/06* (2013.01); *A01C 21/002* (2013.01); *A01C 23/007* (2013.01); *A01M 7/0089* (2013.01); *A01M 9/0092* (2013.01); *G01F 23/0007* (2013.01); *A01C 15/00* (2013.01)

(58) Field of Classification Search
None
See application file for complete search history.

(56) References Cited

U.S. PATENT DOCUMENTS

| | | | | |
|---|---|---|---|---|
| 3,723,989 | A | * 3/1973 | Fathauer | ............... A01C 7/105 111/903 |
| 4,100,538 | A | 7/1978 | Knepler | |
| 4,217,644 | A | * 8/1980 | Kato | ..................... G01F 9/008 377/21 |
| 4,697,173 | A | 9/1987 | Stokes | |

(Continued)

OTHER PUBLICATIONS

Pruette D. "American Vanguard: Providing the Means to Safe, Efficient & Abundant Agriculture Worldwide", Aug. 11, 2016, pp. 13 and 19-20 (Year: 2016).*

*Primary Examiner* — Shaun M Campbell
*Assistant Examiner* — Aneta B Cieslewicz
(74) *Attorney, Agent, or Firm* — Taft Stettinius & Hollister LLP; Stephen F. Rost

(57) ABSTRACT

A control system is disclosed for a material application system. A sensor may be disposed and configured to monitor one or more of a material level and a material flow for the material application system. A signal may be received from the sensor corresponding to the material level or flow. A reference quantity of material contained by the material application system, an expected application rate for the material, and an indicator of current application duration may be determined. An estimated application rate may be determined based upon one or more of the indicator of current application duration, the reference quantity of material, and the signal. The estimated and expected application rates may be compared and the expected application rate updated based upon the comparison. A remaining interval for application without a replenishment of the container may be determined and indicated to an operator.

18 Claims, 4 Drawing Sheets

(56) References Cited

U.S. PATENT DOCUMENTS

| | | | | |
|---|---|---|---|---|
| 5,301,848 A * | 4/1994 | Conrad | ............. | A01C 7/105 |
| | | | | 111/903 |
| 5,641,011 A * | 6/1997 | Benedetti, Jr. | ............. | B65B 1/06 |
| | | | | 137/614.02 |
| 5,687,782 A * | 11/1997 | Cleveland | ............. | A01C 7/06 |
| | | | | 141/346 |
| 8,464,907 B2 * | 6/2013 | Ellingson | ............. | A01C 7/105 |
| | | | | 222/412 |
| 2004/0244658 A1* | 12/2004 | Conrad | ............. | A01C 7/206 |
| | | | | 111/170 |
| 2012/0036914 A1* | 2/2012 | Landphair | ............. | A01C 7/081 |
| | | | | 73/1.16 |
| 2012/0200697 A1* | 8/2012 | Wuestefeld | ............. | G01F 1/00 |
| | | | | 348/137 |
| 2015/0059626 A1* | 3/2015 | Conrad | ............. | A01M 9/0092 |
| | | | | 111/120 |

\* cited by examiner

CONTROL SYSTEM FOR APPLICATION OF LIQUID OR SOLID MATERIAL

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The present disclosure relates to control of the application of liquid or solid materials, including monitoring and calibration of material application equipment in agricultural settings.

BACKGROUND OF THE DISCLOSURE

In various settings, it may be useful to apply (e.g., distribute or disperse) various materials in a relatively controlled manner. For example, in agricultural settings, it may be useful to apply pesticide, herbicide, or fertilizer to select locations in a field, in order to control pest activity, kill weed, and encourage crop growth, respectively. In various applications, including in agricultural settings, other materials may also be applied.

Material for application may take a variety of forms, including liquid form or solid form. Liquid for application may be provided in various containers, such as liquid tanks, which may or may not be refillable by users. Solid material for application may also be provided in various containers, such as hoppers, boxes, or tanks, which may or may not be refillable by users. Solid material may be provided in a variety of forms, including as pellets, granules, or powders.

Application of material may be achieved using various application equipment. For certain materials, such as solid granules, gates or other controllable openings may release material onto a spreader (e.g., a rotating disc), into a distribution duct (e.g., a pneumatic tube or other duct for directing the material to an application point), or directly onto an application point. For certain materials, such as liquids, a sprayer device (e.g., a nozzle attached to the end of a telescoping or foldable boom) may be utilized.

In various applications, it may be useful to determine the actual rate of application of material. In agricultural settings, for example, it may be useful to apply a precise amount of fertilizer, pesticide, or herbicide at various locations in a field. As such, it may be useful to determine the current (or historical) application rate for the relevant material. In various applications, it may also be useful to determine the remaining quantity of material within a given container, as well as the remaining interval (e.g., of time or space) during which application of material from a given container may be possible. The disclosed control system (and control methods implemented thereby) may provide this, and other, functionality.

SUMMARY OF THE DISCLOSURE

A control system is disclosed for application of various materials, including for application of pesticide, herbicide or fertilizer material in agricultural settings.

According to one aspect of the disclosure, a control system may include a sensor disposed and configured to monitor a material level or material flow for a material application system. A signal may be received corresponding to the material level or flow. A reference quantity of material contained by the material application system, an expected application rate for the material, and an indicator of current application duration may be determined. An amount of material remaining for application may be determined based upon the signal, the reference quantity of material, the expected application rate, or the indicator of current application duration. A remaining interval for application without a replenishment of a material container may be determined based upon the amount of material remaining for application and the expected application rate. An indicator of the remaining interval may be provided to an operator of the material application system.

In certain embodiments, the control system may include a plurality of containers. A plurality of remaining intervals for application without a replenishment of the plurality of containers may be determined, each of the plurality of remaining intervals being associated with a corresponding one of the plurality of containers. A display device may be caused to display indicators of the plurality of remaining intervals for application to the operator.

In certain embodiments, a first one or more of the plurality of containers may be identified as having a lower remaining interval for application than a second one or more of the plurality of containers. The display device may provide a current display of only a subset of the indicators of the plurality of remaining intervals of application, the subset corresponding to the first one or more of the plurality of containers.

In certain embodiments, the control system may include two containers. A second container may be configured to receive material from a first container before application of the material. The material level may correspond to a current material level for the first container. The material flow may correspond to a current material flow from the first container to the second container or a current material flow out of the second container.

According to another aspect of the disclosure, a control system may include a sensor disposed and configured to monitor one or more of a material level and a material flow for the material application system. A signal may be received corresponding to the material level or flow. A reference quantity of material contained by the material application system, an expected application rate for the material, and an indicator of current application duration may be determined. An estimated application rate may be determined based upon one or more of the indicator of current application duration, the reference quantity of material, and the signal. The estimated and expected application rates may be compared. The expected application rate may be updated based upon the comparison of the estimated and expected application rates.

In certain embodiments, updating the expected application rate may include providing an indicator of the comparison of the estimated and expected application rates to the operator, and receiving an updated application rate value based upon an operator input.

The details of one or more implementations of the disclosure are set forth in the accompanying drawings and the description below. Other features and advantages will become apparent from the description, the drawings, and the claims.

BRIEF DESCRIPTION OF THE DRAWINGS

Like reference numerals in the drawings indicate like components, parts, or operations.

DETAILED DESCRIPTION

Figure 1:
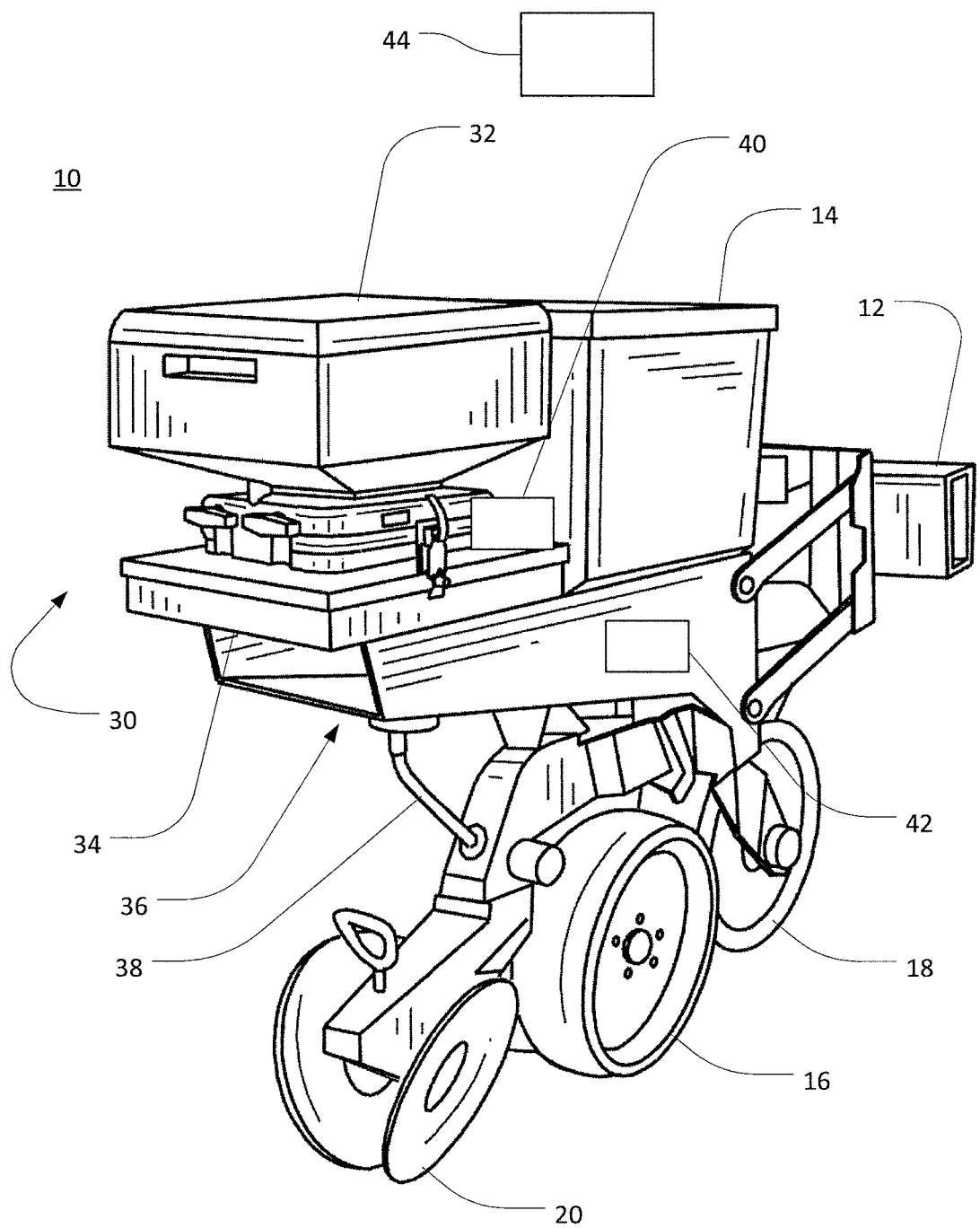
FIG. 1 is a rear perspective view of example material application system, including a control system, for application of material during a seeding operation.

The following describes one or more example implementations of the disclosed system, as shown in the accompanying figures of the drawings described briefly above.

As noted above, it may be useful to control application of material (e.g., liquid or solid herbicide, fertilizer, pesticide, and so on) with relative precision. Accordingly, for example, where containers for the material to be applied may require replenishment (e.g., refilling or replacement) during an extended application operation, it may be useful to know with relative precision when a replenishment will be needed. As another example, it may also be useful to know, with relative precision, the actual rate of application of material during an application operation.

In many known systems, however, the actual application rate for material may be relatively uncertain and may vary from an expected application rate (e.g., a nominal rate for a particular application device operating in a particular mode) for various reasons. For example, variations in the material being applied, in environmental conditions, and in the performance of an application device (e.g., a gate, flap, nozzle, and so on) may result in actual application rates of material that vary significantly from the expected application rate for a given operation. Accordingly, use of an un-adjusted expected application rate to guide an application operation may result in considerable uncertainty regarding the amount of material that is being applied at any given location as well as the total amount of material that has been applied over a given interval of time. This, in turn, may result in considerable uncertainty regarding when a particular container may need to be replenished in order to continue an application operation without unplanned interruption. Relatively precise sensors may be available to improve understanding of application rates, but these sensors may be prohibitively expensive for certain operations, or may be insufficiently robust to operate with the desired materials in the desired locations, and for the desired duration. Accordingly, it may be useful to provide a system for calibrating an expected application rate based upon historic performance (e.g., measured or derived actual application rates), based upon information from relatively inexpensive and robust sensors.

In addition to calibrating expected application rates, it may also be useful to determine the remaining amount of material in a given container, in order to allow an operator to plan for replenishment operations and avoid unplanned interruptions in application operations. Further, it may be useful to present information relating to the remaining material in a particular container in a more useful format than simply a volume or weight measurement. For example, as an operator executes an application operation, the operator may not have the ability to quickly and accurately translate a remaining weight or volume of material into an estimate of when a replenishment may be required. Accordingly, it may also be useful to present an operator with an indicator of a remaining interval of time, distance, or application area before a replenishment may be needed.

The disclosed control system (and methods executed thereby) may provide the functionality discussed above, as well as various other benefits. Generally, the control system may include one or more sensors to monitor material levels (e.g., heights or weights) or material flows for a material application system. A controller (e.g., a processing device) may be configured to interpret the signals from the sensors and determine a remaining amount of material for a particular container of the material application system. The controller may further process the determined remaining amount of material in order to present information to an operator relating to the amount of travel distance, travel time, or area over which material may be applied before replenishment of the container may be needed.

The disclosed control system may also be useful with regard to calibration of expected flow rates for the material application system. For example, the controller may determine an estimated application rate based upon information from the sensors or other parameters and compare the estimated application rate to an expected application rate. Where the two application rates differ by a particular amount (or degree), the controller may accordingly update the expected application rate for further operation of the material application system.

Referring now to FIG. 1, the disclosed control system may be implemented with respect to a seeder row unit 10, which may be configured to distribute seeds along a row of a field. In various embodiments, the row unit 10 may be mounted to an agricultural implement, which may be towed along a field by a tractor (not shown) or other vehicle. A frame 12 of such an implement is depicted in FIG. 1.

In certain embodiments, the row unit 10 may be deployed as part of an array of multiple seeders (not shown), such that multiple rows of seeds may be sown at one time. In such a configuration, the disclosed control system (or multiple versions of the disclosed control system) may be utilized to control material application with regard to each of the multiple seeders (or a subset thereof). Accordingly, although control of material application with regard only to the single row unit 10 may be discussed below, it will be understood that similar principles may be extended to control of material application with regard to multiple seeders.

It will further be understood that the row unit 10 is presented by way of example only. In other embodiments, the disclosed control system may be disposed to operate with respect to seeders of other configurations, or with respect to other types of equipment. For example, the disclosed control system may be utilized to control solid or liquid material application with respect to sprayers, tillage implements, or various other agricultural implements. Further, the disclosed control system may be utilized in non-agricultural applications, where controlled application (e.g., spraying or spreading) of material may be useful.

Still referring to FIG. 1, the row unit 10 includes a hopper 14 for storing seeds, which may be sown along rows of a field with a seeding device 16. Forward discs 18 on the row unit 10 may be utilized to open a furrow in a field for planting the seed, and trailing discs 20 may be utilized to close the furrow over the sown seed. Before the furrow is closed, however, it may be useful to apply material of various kinds into the furrow along with (e.g., alongside of) the seed. In other applications, material may be otherwise applied, including to locations outside of the seed furrow.

As depicted, the row unit 10 includes a material application system 30, including a replaceable material container configured as a transfer box (or material box) 32, and a fixed material container configured as a base box 34. The transfer box 32 may be generally configured to contain material such as granulated, powdered, or liquid pesticide, herbicide, or fertilizer, or material of other types and forms. As depicted, the transfer box 32 is configured to contain relatively caustic material (e.g., pesticide) such that direct handling of the material by an operator may not be required. Rather, the transfer box 32 may be seated above the base box 34 and secured in place. A transfer passage (not shown in FIG. 1) may then be opened (e.g., automatically or manually) in order to allow material to flow from the transfer box 32 to the base box 34. Once the transfer passage has been opened, material in the transfer box 32 may flow from the transfer box 32 to the base box 34 for routing through a dispersal system 36. For example, material from the base box 34 (as received from the transfer box 32 via the transfer passage) may flow through a material conduit 38 to an applicator outlet or nozzle (not shown) for application into the field (e.g., application into the seed furrows opened by the discs 18). Once the transfer box 32 is substantially empty of material (e.g., once material stops flowing from the transfer box 32 to the base box 34), the transfer box 32 may be removed from the system 30 and replaced with a different, substantially full transfer box (not shown in FIG. 1). In this way, application of material sufficient to cover a desired area of a field (or other location) may be accomplished through the use of multiple transfer boxes 32 with a single corresponding base box 34.

In certain embodiments, multiple sets of transfer and base boxes 32 and 34 (or other containers) may be utilized for a particular material application operation. For example, the row unit 10 depicted in FIG. 1 may be one of many row units (not shown) mounted to one or more agricultural implements, such that a particular row unit (e.g., the row unit 10) may be provided to seed each of a plurality of rows of a field. Likewise, in embodiments including other equipment (e.g., a sprayer rather than a seeding device), any number of sets (including single) material application systems may be provided in order to allow for appropriate application of material for a particular operation (e.g., a fertilizing, weed-control, or other operation).

In certain embodiments, a different number of containers may be utilized for supplying the material to be applied. For example, a single container or a different arrangement of multiple containers may be utilized, rather than the depicted transfer and base boxes 32 and 34. In certain embodiments, a centralized container (e.g., a large storage hopper or tank) may be utilized for storing material, rather than (or in addition to) the transfer box 32 or base box 34.

In certain embodiments, a container for material (e.g., a container similar to the transfer box 32) may be replenished via a refill operation, rather than a replacement operation (e.g., such as a replacement operation described above for the transfer box 32). For example, in certain systems, the relevant container may be refillable, such that when the container is substantially empty (or otherwise depleted) of material, additional material may be added to the container without removing the container from the material application system. Such a container may be configured, for example, as an open-topped or lidded hopper, as a tank with a manually (or otherwise) accessible port, or in various other ways.

Various sensors may be provided in order to assist in monitoring of a material application operation. As depicted, for example, one or more sensors 40 are disposed on the row unit 10. As discussed in greater detail below, the sensors 40 may be disposed and configured to monitor (i.e., to sense and provide signals corresponding to) various parameters including the flow of material within the row unit 10 (or elsewhere) and material levels at various points within the system. It will be understood that the location depicted for the sensor 40 is presented as an example only. In various embodiments, one or more of the sensors 40 may be disposed at various other locations on the row unit 10 (or elsewhere), as may be appropriate for monitoring of the relevant parameter(s).

Material levels monitored by the sensors 40 may include, for example, a monitored height, volume, or weight of material, as measured at one or more points on the relevant system. In certain embodiments, the sensors 40 may include a level sensor configured to sense a material level for the transfer box 32 and a flow sensor configured to sense whether (and, potentially, how much) material is flowing from the base box 34 to the dispersal system 36.

A controller 42 may also be provided, in order to implement various operations. As depicted, the controller 42 is disposed on the row unit 10, similarly to the sensors 40. In other embodiments, the controller 42 may be disposed at other locations, including on a vehicle (not shown) pulling the row unit 10 or at a remote location (e.g., a remote monitoring and control station).

The controller 42 may be configured as a computing device with associated processor devices and memory architectures, as a hard-wired computing circuit (or circuits), as a programmable circuit, or otherwise. As such, the controller 42 may be configured to execute various computational and control functionality with respect to the material application system 30, or other systems or equipment.

The controller 42 may communicate electronically, or in other ways, with various other systems or devices of the material application system 30, as well as remotely located systems or devices. For example, the controller 42 may be in electronic communication with various actuators, sensors (e.g., the sensors 40), and other devices within (or outside of) the material application system 30. The controller 42 may communicate with other systems or devices (including other controllers) in various known ways, including via a CAN bus (not shown), via wireless communication means, or otherwise.

In certain embodiments, a display device 44 may be provided to convey various information regarding the material application system 30 to an operator of the system 30. The display device 44 may be configured in various known ways, including as a computer monitor, touchscreen device, LED indicator, and so on. In certain embodiments, the display device 44 may be mounted on (or nearby) the row unit 10, such that an operator may view the display device 44 when inspecting the row unit 10. In certain embodiments, the display device 44 may be disposed at other locations. For example, the display device 44 may be included in the cab of a vehicle (not shown) configured to tow the row unit 10 over a field.

Figure 2:
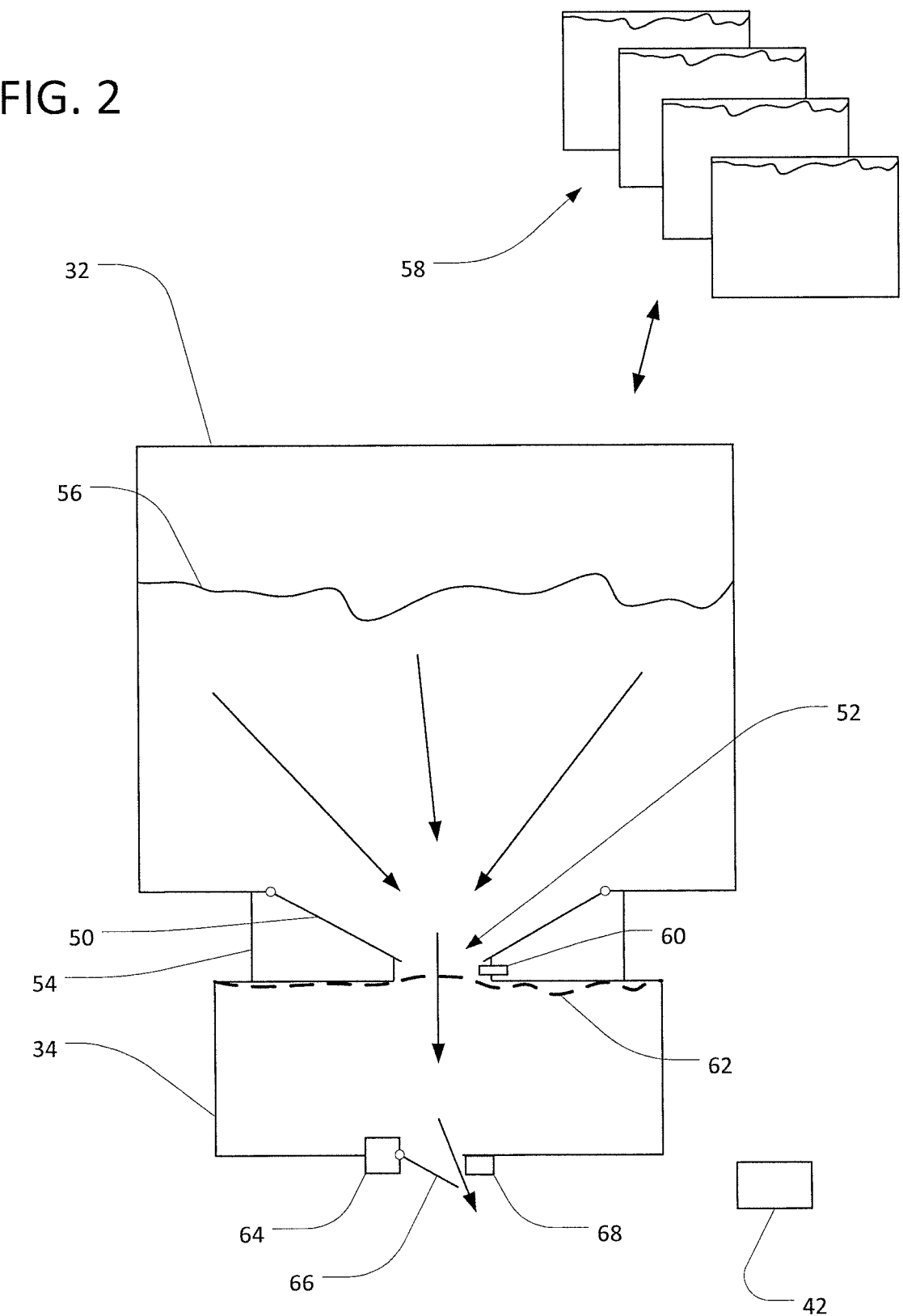
FIG. 2 is a schematic view of the aspects of the material application system of FIG. 1.

Referring also to FIG. 2, the transfer box 32, base box 34 and related components are depicted in schematic detail. It will be understood that the various features and mechanisms depicted in FIG. 2 are presented as one example only and that other configurations of the transfer box 32, base box 34 and related components may be possible. Likewise, as also noted above, the disclosed control system (and related method) may be utilized with respect to material application systems other than the example system depicted in FIGS. 1 and 2.

Generally, a transfer box may include a controllable opening for restricting flow of material out of the transfer box when the transfer box is not mounted to a material application system, and allowing flow of material out of the transfer box when the transfer box is mounted to the material application system. As depicted, the transfer box 32 includes a gate 50 disposed at the bottom of the transfer box 32. In certain embodiments, the gate 50 may be configured to automatically open to provide a transfer passage 52 when the transfer box 32 is attached to the base box 34 at a mounting structure 54. In certain embodiments, the gate 50 may be manually (or otherwise) opened based upon operator input or actions.

Generally, the transfer box 32 may be mounted to the mounting structure 54 when the transfer box 32 contains a relatively large amount of the material to be applied (e.g., when the transfer box 32 is substantially full of material). In this way, as indicated by arrows in FIG. 2, material may flow from the transfer box 32 into the base box 34 and a level 56 of material may be gradually reduced. In certain embodiments, the transfer box 32, as well as multiple reserve (or substitute) transfer boxes 58, may contain a predetermined amount of material (e.g., a predetermined weight of material, such as 50 lbs.), such that when a substantially full transfer box (e.g., the transfer box 32, with approximately 50 lbs. of material) is mounted to the mounting structure 54, a known amount of material may be made available to the material application system 30. Similarly, when the transfer box 32 is replenished via replacement with one of the reserve transfer boxes 58, a known amount of material may be made available to the material application system 30. The transfer box 32 may be generally designed to be replenished when the transfer box 32 is substantially empty (e.g., when the transfer box 32 is depleted by material flow out of the transfer box 32, such that material no longer flows from the transfer box 32 through the transfer passage 52). Where a refillable container (not shown) is utilized, refilling a container completely (or to a designated "full" level) may also make a known amount of material available to the material application system 30.

As material flows (or does not flow) from the transfer box 32 (or other container) through the transfer passage 52, a level sensor 60 (e.g., a mechanical switch, optical sensor, or other device) may monitor the material level. As depicted, the level sensor 60 is disposed just below the gate 50 and is configured to indicate the presence (or absence) of material at the location of the level sensor 60. In this way, the level sensor 60 may monitor a material level for the transfer box 32 by detecting (and signaling to the controller 42) when material is no longer present in the transfer passage 52. In various instances, this may correspond to when the transfer box 32 has been substantially emptied of material, as indicated by a reduced material level 62 in FIG. 2.

Other locations and configurations for a level sensor may be possible. In certain embodiments, a level sensor may be integrated into (or otherwise mounted on) the transfer box 32 or may be disposed at other locations on the material application system 30. In certain embodiments, a level sensor may be configured as a load sensor (or multiple load sensors) disposed to measure the weight of the transfer box 32 (or other components of the material application system 30), rather than a height of material. In embodiments with a load sensor, the load sensor may, for example, be utilized to determine that the transfer box 32 (or other container) is substantially empty of material based upon comparing the detected weight of the transfer box 32 (or other container) with a reference weight.

In certain embodiments, the base box 34 may be configured to contain a predetermined amount of material (e.g., a predetermined weight of material, such as 16 lbs.), such that, when the base box 34 is substantially full, the base box 34 may provide a known amount of material to the material application system 30. In this way, for example, when the transfer box 32 is substantially depleted (or substantially full) and the base box 34 is substantially full, the amount of material available to the material application system 30 may generally be determined based upon the capacity of one or both of the two boxes 32 and 34.

In order for material to be applied as desired, material may be metered from the base box 34 (or other container or component). In various embodiments, a metering device 64 may be disposed at the bottom of the base box 34, in order to control flow of material from the base box 34 and, thereby, to control the rate of application of material to the field (or other location). As depicted, the metering device 64 is configured to cycle a gate 66 between open and closed configurations, in order to permit and restrict, respectively, flow of material out of the base box 34. In certain implementations, the rate of application of material to a field (or other location) may be controlled via control of the frequency with which the gate 66 is cycled or the relative amount of time (e.g., the portion of a given time interval) during which the gate 66 is open or closed.

Due to various factors, the actual rate of material flow past the gate 66 (e.g., as controlled by the metering device 64) may vary from the expected rate of material flow past the gate 66. For example, varying characteristics of the material may change the manner in which the material flows past the metering device 64 for a given setting of the metering device 64. Likewise, environmental variations, wear or fouling of the metering device 64, or other factors may result in the actual flow rate of material past the gate 66 varying from the expected flow rate.

In certain embodiments, a metering device (e.g., configured similarly to the metering device 64) may be disposed at another location on the material application system 30. For example, a metering device may be disposed along, or at the end of, the material conduit 38 (see FIG. 1) or another location, in order to control the application rate of the material to a field (or other application site). In certain embodiments, a metering device may be utilized that controls the application rate in different ways than the depicted metering device 64. For example, a metering device may alternatively (or additionally) be configured to selectively restrict a flow orifice (e.g., a gate or a nozzle opening), to control an operating speed or intensity (e.g., pump pressure) of a material-dispersal device such as a spreader or sprayer (not shown), or otherwise meter flow of material from a container (e.g., the base box 34) to an application site (e.g., a furrow in a field).

In various operations, a flow sensor may monitor material flow through the material application system 30 during operation of the material application system 30. For example, in the embodiment depicted, a flow sensor 68 is disposed near the gate 66 of the base box 34 in order to monitor flow of material out of the base box 34. The flow sensor 68 may be configured as an optical sensor or in various other ways. In certain embodiments, the flow sensor 68 may monitor whether material is flowing through the system 30 (e.g., through the gate 66) without quantifying the actual flow rate of the material. In certain embodiments, the flow sensor 68 may be configured to quantify (or facilitate quantification of) the actual flow rate of material.

As depicted, the flow sensor 68 is disposed just below the gate 66 and is configured to detect whether material is (or is not) flowing through the gate 66 (and signal such detection to the controller 42), without providing detailed measurements of the actual magnitude of the material flow rate. In this way, the flow sensor 66 may detect (and signal to the controller 42) when material no longer flows from the base box 34 through the gate 66 (when the gate 66 is open) and, accordingly, when the base box 34 has been substantially emptied of material. The use of the flow sensor 68 to monitor the presence or absence of material flow, without necessarily quantifying the magnitude of the flow may, for example, allow the use of a relative inexpensive sensor, which may not need extensive calibration for different material types.

Other locations and configurations for a flow sensor may be possible. In certain embodiments, for example, a flow sensor may be integrated into (or otherwise mounted on) the base box 34 or transfer box 32, or may be disposed at other locations on the material application system 30.

Generally, during operation of the material application system 30, the transfer box 32 may be mounted to the row unit 10 when substantially full. The gate 50 may open, accordingly, such that material may flow from the transfer box 32 to the base box 34. In certain operations, the base box 34 may already contain some material (e.g., may be substantially full of material) when the transfer box 32 is mounted. In certain operations, the base box 34 may not contain material when the transfer box 32 is mounted.

As the material is applied (e.g., via the material conduit 38), the material may generally flow from the transfer box 32 to the base box 34 via the transfer passage 52. Accordingly, the material level in the transfer box 32 may generally fall until the level sensor 60 detects that the material level is below the location of the level sensor 60. At this point, the transfer box 32 may be substantially empty of material, and may accordingly be ready for replacement with one of the reserve transfer boxes 58.

The flow sensor 68 may also be active during operation of the material application system 30 and may accordingly provide signals to the controller 42 that may indicate whether material is flowing through the gate 66. When the gate 66 is open and no flow is detected by the flow sensor 68, this may indicate that a blockage has occurred (e.g., a blockage in the transfer passage 52 or base box 34) or that the base box 34 has been substantially emptied. In the latter case, because the base box 34 may be generally filled with material from the transfer box 32, the absence of flow detected by the flow sensor 68 may accordingly also correspond to the transfer box 32 being substantially empty of material and, therefore, in need of replenishment.

Figure 3:
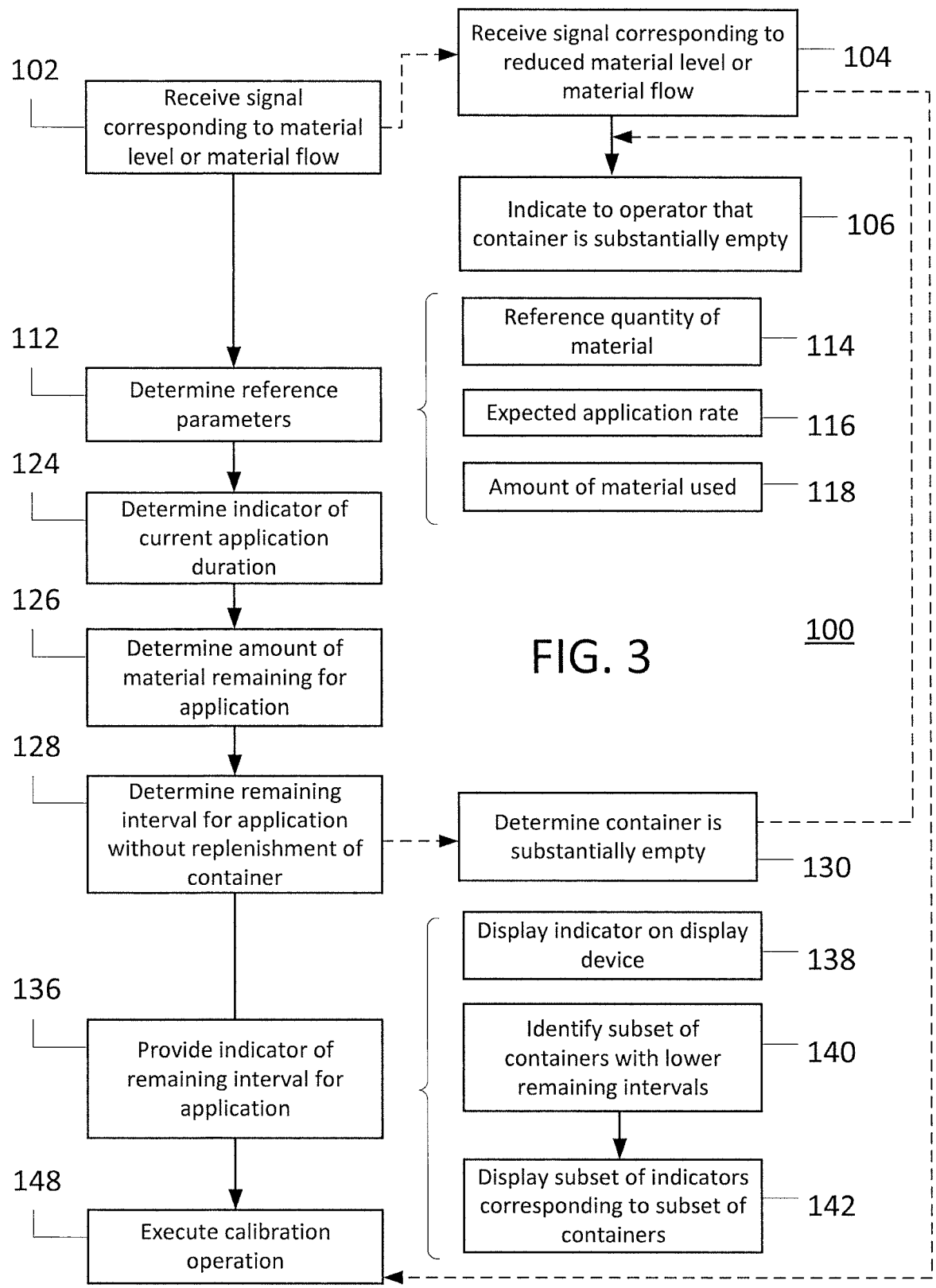
FIGS. 3 and 4 are diagrammatic representations of aspects of a control method that may be implemented by the control system of FIG. 1, or other control systems.

Referring also to FIG. 3, various control operations are presented that may be executed (e.g., by the controller 42 or other devices) as part of a material monitoring ("MM") method 100, with respect to the material application system 30. The MM method 100 may be implemented in various ways, including through automatic operations executed by the controller 42, through manual operations (e.g., as executed by an operator of the material application system 30 or an associate agricultural implement), or through a combination of automatic and manual operations.

The various operations described herein may be discussed in the context of the configuration of the material application system 30 depicted in FIGS. 1 and 2. As noted above, however, the configuration of the material application system 30 of FIGS. 1 and 2 is presented as an example only. Other configurations may be possible, including with regard to the containers utilized for holding the material to be applied, the various sensors utilized to monitor material level or flow, the metering devices utilized to control material flow, and so on. Accordingly, various of the operations described herein (e.g., those of the MM method 100 described below) may be executed with respect to material application systems other than the example system 30 depicted in FIGS. 1 and 2.

Similarly, various operations described herein may be discussed with respect to a single instance of the material application system 30 (e.g., the various equipment mounted to the row unit 10 (see FIG. 1). It will be understood, however, that similar operations may be executed with respect to multiple application systems 30 (or multiple sub-systems thereof), such as may be utilized with respect to an agricultural implement with multiple instances of the row unit 10, each with a corresponding instance of the material application system 30 (or other material application system).

As depicted in FIG. 3, the MM method 100 may include receiving 102 (e.g., at the controller 42) a signal corresponding to a current material flow or current material level for the material application system 30. For example, the level sensor 60 (see FIG. 2) may detect whether material is present at the outlet of the transfer box 32 and provide a corresponding signal to the controller 42. Accordingly, a signal received 102 at the controller 42 may indicate whether the material level in the material application system 30 has fallen to the point that the transfer box 32 may be substantially empty. Similarly, the flow sensor 68 (see FIG. 2) may detect whether material is flowing at the outlet of the base box 34 and may provide a corresponding signal to the controller 42. Accordingly, a signal received 102 at the controller 42 may indicate whether the base box 34 may be substantially empty of material (e.g., if the gate 50 is open, but no flow is detected).

Where a signal corresponding to a reduced material level or flow is received 104 by the controller 42, the controller 42 may determine that a container (e.g., one or both of the base box 34 and the transfer box 32) may be substantially empty and, accordingly, in need of replenishment (e.g., replacement or refill). The controller 42 may then indicate 106 to an operator that the relevant container may need replenishment. For example, the controller 42 may cause the display device 44 to display an indicator to an operator that a particular container (e.g., the transfer box 32) may be substantially empty and therefore in need of replenishment.

In certain embodiments, signals received 100 from the sensors 60 and 68 (or other devices) may provide other useful information. For example, if a signal received 100 from the level sensor 60 indicates that the transfer box 32 is not substantially empty, but a signal received 100 from the flow sensor 68 indicates zero flow out of the base box 34 (or at another location) even though the gate 50 may be open, the controller 42 may determine that a jam may have blocked flow of material within the material application system 30. An indicator of this determination (or other similar determinations), may accordingly be provided to an operator. For example, the controller 42 may cause the display device (see FIG. 1) to display a message (or other indicator) indicating that a blockage may have occurred.

The MM method 100 may further include determining 112 various reference parameters. For example, the controller 42 may be configured to determine (and store in an associated memory architecture), a reference quantity 114 of material contained by the material application system 30, an expected application rate 116 for the material (e.g., expressed in a target weight or volume of material applied per distance of travel or per area of application), and a value indicating an amount 118 of material already used during a current application operation (e.g., the amount 118 of material used with respect to the currently mounted transfer box 32).

In certain implementations, various reference parameters 112 may be determined based upon default system characteristics. For example, where the transfer a box 32 contains a known quantity (e.g., weight) of material when substantially full, the detected mounting of the (full) transfer box 32 to the row unit 10 may indicate that the known quantity (e.g., weight) of material has been added to the material application system 30. Similarly, where the base box 34 has a known capacity (e.g., weight capacity) for material, a reference amount of material remaining in the transfer box 32 after it has been mounted to the base box 34 may be reduced by the known capacity of the base box 34. For example, where the transfer box 32 has a full capacity of 50 pounds and the base box 34 has a known capacity of 16 pounds, when the full transfer box 32 is mounted to the empty base box 34 and the gate 50 opened, it may be determined 112 that the reference quantity of material 114 in the transfer box 32 may be 34 pounds. A different reference quantity of material 114 in the transfer box 32 may be similarly determined 112, where the transfer box 32 has an alternative capacity (e.g., due to being only half-empty when the transfer box 32 is mounted).

Certain reference parameters may be determined 112 based upon operator input. For example, at the start of a particular application operation, an operator may utilize an input device (e.g., a touchscreen device) in order to provide values for the expected application rate 116 of material (e.g., a target application rate for a particular material), the reference quantity 114 of material (e.g., the weight of material in a transfer box that has just been mounted to the material application system 30), the amount 118 of material already used (e.g., the weight of material already used from a transfer box that has just been mounted to the material application system 30).

The MM method 100 may further include determining 124 an indicator of current application duration, which may correspond to the amount of time or distance over which a current application operation has continued. In certain implementations, the determined 124 indicator of current application duration may correspond to the duration of application for a container of known material capacity. For example, the MM method 100 may include determining 124 an indicator of the distance of travel over which material from the transfer box 32 has been applied, with the "zero" or reference point for the start of the duration corresponding to the transfer box 32 being substantially full of material (e.g., the start of application immediately after the transfer box 32 is mounted to the material application system 30).

In certain implementations, a counter may be utilized to assist in determining 124 the indicator of current application duration. For example, information from a timer may be utilized directly to determine 124 an indicator of a current application time interval, or may be combined with information from a speed sensor in order to determine the distance over which the row unit has traveled with the transfer box 32 providing material for application. Alternatively (or additionally), information from a global positioning system ("GPS") may be utilized to determine 124 a similar indicator (e.g., a total travel distance for application from the currently mounted transfer box 32).

The MM method 100 may further include determining 126 an amount of material remaining for application. In certain implementations, the determined 126 amount may correspond to the amount of material remaining before a particular container (e.g., the transfer box 32) will need to be replenished (e.g., replaced with one of the reserve transfer boxes 58 (see FIG. 2)). In certain implementations, the determined 126 amount may correspond to the amount of material remaining in a different portion of the material application system 30 (e.g., in both the transfer box 32 and the base box 34).

In certain implementations, the amount of material remaining for application may be determined 126 based upon signals received from the level sensor 60 or the flow sensor 68, or both. For example, where the amount of material that may be held by the base box 34 is known (e.g., of a known weight), the controller 42 may determined 126 that the amount of material remaining for application is approximately equal to the amount of material that may be held by the base box 34, based upon receipt of a signal from the level sensor 60 indicating that the transfer box 32 is substantially empty. Similarly, where the level sensor 60 indicates that the transfer box 32 is substantially empty and the flow sensor 68 indicates zero flow through the gate 66, it may be determined 126 that substantially no material remains in either the transfer box 32 or the base box 34.

In certain implementations, the amount of material remaining for application may be determined 126 based upon the expected application rate 116 and the determined 124 indicator of application duration. For example, where the expected application rate 116 is expressed as a ratio of material weight to distance traveled (or area covered), and the determined 124 indicator of application duration corresponds to a distance traveled (or area covered), the distance traveled may be multiplied by the application ratio in order to yield an estimate of the amount of material applied over the determined 124 duration (e.g., with the currently mounted transfer box 32). This estimate of the amount of material applied may then be compared to the reference quantity 114 of material in order to determine 126 the amount of material remaining for application.

As noted above, the reference quantity 114 of material may correspond to a starting quantity of material in the mounted transfer box 32 (or in various other locations or containers). The controller 42 may accordingly subtract the estimate of material applied (e.g., as determined from the expected application rate 116 and the distance corresponding to the determined 124 application duration) from the reference quantity 114 of material, in order to determine 126 the amount of material that may remain in the transfer box 32 before the transfer box 32 will need to be replenished (e.g., refilled or replaced). In other implementations, similar determination 126 may be executed with respect to other containers, such as hoppers or tanks of known material capacity that are configured to be refilled when substantially empty. For example, where the level sensor 60 indicates that the transfer box 32 may be empty, the expected application rate may be multiplied by a corresponding duration (or distance) after the transfer box 32 has been emptied, then subtracted from the determined 112 reference quantity 114 of material in the base box 34 (e.g., a maximum capacity of the base box 34), in order to determine the amount of material that may be remaining in the base box 34.

Based upon the determined 126 amount of material remaining for application, the controller 42 may then determine 128 a remaining interval (e.g., of time or space) for application of material before a replenishment (e.g., refill or replacement) of a relevant container may be required. In certain implementations, the controller 42 may determine 128 a remaining interval based upon the determined 126 remaining material and the expected 116 application rate. For example, where the expected application rate 116 is expressed as a ratio of material weight to distance traveled, the determined 126 remaining material (expressed in weight) may be divided by the expected application rate 116 to determine 128 a remaining interval in terms of remaining distance to travel (e.g., miles) before a replenishment of the relevant container (e.g., the transfer box 32) may be needed.

In certain implementations, the determined 128 remaining interval may be expressed in terms of time remaining for application of material, before replenishment may be needed. For example, after a remaining interval of distance has been determined 128, the determined 128 distance interval may be divided by an average (or actual) speed of the relevant system (e.g., an implement carrying the row unit 10) in order to determine 128 a remaining interval in terms of time remaining for application of material.

In certain implementations, the determined 128 remaining interval may be expressed in terms of coverage area remaining before replenishment. For example, after a remaining interval of distance has been determined 128, the determined 128 distance interval may be multiplied by a working width of the relevant systems (e.g., the total width covered by an array of row units 10, each with a material application system) in order to determine 128 a remaining interval in terms of remaining area over which material may be applied before replenishment may be needed.

In certain implementations, the MM method 100 may include determining 130 that a relevant container (e.g., the transfer box 32) is substantially empty, based upon determining 128 the remaining interval for application of material. For example, where the controller 42 has determined 128 a relatively small remaining interval for application, the controller 42 may then indicate 106 to the operator that the relevant container is (or is almost) substantially empty.

In certain implementations, the determined 128 remaining interval may be utilized in conjunction with other information, in order to determine whether to indicate 106 that a container is substantially empty. For example, a received 104 signal corresponding to reduced material flow may sometimes indicate a substantially empty container, but may alternatively indicate a blockage or jam that is preventing flow of material from an otherwise relatively full container. A relatively small determined 128 remaining interval may confirm that the received 104 low-flow (e.g., zero flow) signal may correspond to a substantially empty container, and the controller 42 may accordingly indicate 106 to the operator (e.g., via the display device 44) that a container replenishment may be needed. If, however, the determined 128 remaining interval is relatively large, this may indicate that the received 104 low-flow signal may actually correspond to a blockage or jam, rather than a substantially empty container. Accordingly, the controller 42 may indicate to an operator that a blockage may have occurred, rather than indicating 106 that a container may be substantially empty.

The MM method 100 may further include, once a remaining interval for application (without replenishment) has been determined 128, providing 136 an indicator of the remaining interval. Providing 136 the indicator of the remaining interval may include, for example causing a display 138 of an indicator on a display device (e.g., the display device 44), such that the indicator may be viewed (or otherwise engaged) by an operator. The indicator may be displayed 138 in a variety of ways. In certain implementations, a numerical value representing the determined 128 remaining interval may be displayed 138. For example, the display device 44 may be utilized to display 138 the determined 128 remaining number of miles, minutes, acres, and so on, until replenishment may be needed, such that an operator may readily understand how soon a replenishment of material may be needed for a particular container (or for the material application system 30, as a whole). In certain implementations, other indicators may be utilized. For example, a graphical representation (e.g., a bar graph, static pictograph, or dynamically updated animation) may be displayed 138 in order to alert an operator to the determined 128 remaining interval.

As noted above, the MM method 100 may be implemented with respect to multiple material application systems 30 (or multiple material containers), such that multiple remaining intervals for application without replenishment may be determined 128 for multiple material containers (e.g., multiple transfer boxes 32). Accordingly, in certain implementations, multiple indicators may be provided 136 to an operator, such that an operator may be made aware of the determined 128 remaining intervals for application for various different containers.

In certain implementations, the display 138 of indicators of the determined 128 remaining intervals for application may not include simultaneous display 138 of every determined 128 indicator. In systems employing dozens of row units 10, for example, it may be impractical or otherwise undesirable to continuously (or simultaneously) display 138 an indicator of the determined 128 remaining interval for application for every one of the material containers for every one of the row units 10. As such, in certain implementations, the display 138 of indicators may encompass (at least for a time) only a subset of the determined 128 remaining intervals.

In certain implementations, the MM method 100 may include operations for displaying 138 indicators of the determined 128 remaining intervals for application for a subset of containers that may be closer to needing a replenishment than other containers. To this end, for example, the MM method 100 include identifying 140 a subset of monitored containers, which may have relatively low determined 128 remaining intervals for application than others of the monitored containers. The identified 140 subset of containers, accordingly, may include those containers that are more likely to need a replenishment (e.g., a refill or replacement) in the near future than containers not included in the identified 140 subset. The display device 44 (or other device) may then be utilized to display 142 a subset of indicators of the determined 128 remaining intervals that corresponds to the identified 140 subset of containers. This may be useful, for example, in order to provide an operator with a more limited, but relatively pertinent set of displayed information, such that the operator may not be distracted by a large number of indicators from the relatively pressing or imminent need of replenishment for a limited subset of containers.

In certain implementations, an operator may be provided with input options (e.g., touchscreen icons) to allow selection of different display modes. One such mode, for example, may include the display 142 of a subset of containers with relatively short determined 128 remaining intervals for application. Another such mode may include the display 138 of indicators for various other subsets (or the entire set) of containers.

As noted above, the MM method 100 may include determining 112 an expected application rate 116. The expected application rate 116 may correspond, for example, to the expected flow of material through the gate 66, as controlled by the metering device 64. Due to various factors, however, the actual application rate of material may vary from the expected application rate 116. Further, for various reasons (e.g., the caustic nature of certain materials, inconvenience, and so on), manual calibration of the metering device 64 (or another metering device) may be executed relatively infrequently. Accordingly, the MM method 100 may also include operations for executing 148 a calibration operation for the material application system 30.

In certain implementations, the MM method 100 may include executing 148 calibration operations based upon receiving 104 a signal corresponding to a reduced material level or material flow. This may be useful, for example, as reduced material level or flow may indicate that a particular container (e.g., the transfer box 32) may be (or may nearly be) substantially empty.

In certain implementations, the MM method 100 may include executing 148 calibration operations based on other factors. For example, the MM method 100 may include executing 148 a calibration method upon the actual replenishment of a container (e.g., replacement of the transfer box 32 with a reserve transfer box 58), upon a pause in material application (e.g., as an implement is repositioned in a field for travel down a new set of rows), or at other times (e.g., at regular intervals with respect to a clock or computation cycle of the controller 42).

As part of executing 148 the calibration operations, the MM method 100 may include determining 150 an estimated application rate. In certain implementations, the initial value of the expected application rate 116 may reflect a manually entered value (e.g., as provided by a manufacturer of the material to be applied or selected by an operator of the material application system 30) or a historical value (e.g., as may reflect an determined application rate for prior application operations). In contrast, an estimated application rate may be an estimate, for example, of the actual application rate for material over the course of a set of application operations (e.g., over the course of application of material to a field from one or more of the transfer boxes 32 and 58). Because various factors may cause application rates to vary over time, the estimated application rate 150 may sometimes provide a more accurate reflection of the rate with which a particular container (e.g., the transfer box 32) may be depleted during a current application operation.

Figure 4:
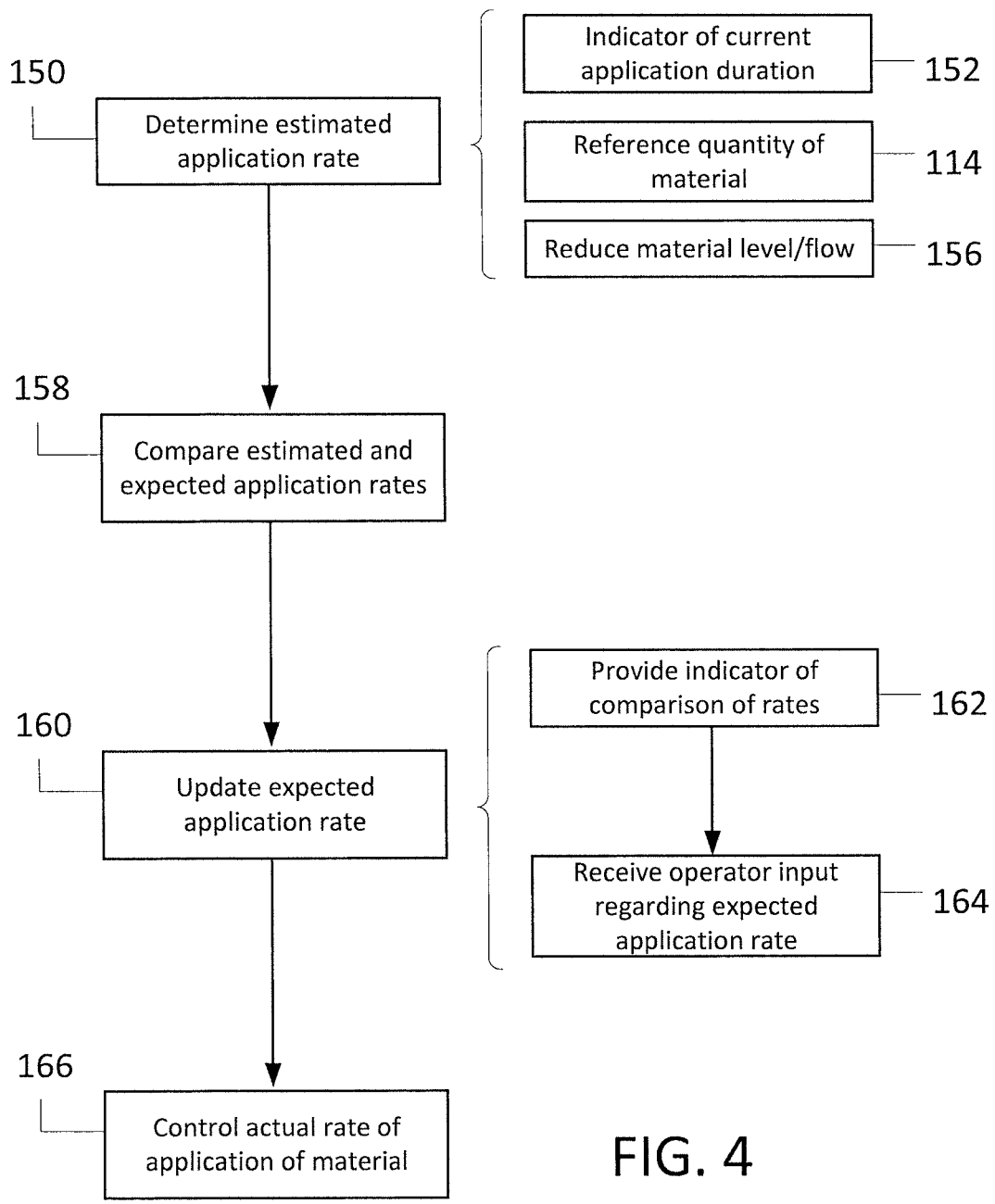

The estimated application rate may be determined 150 in a variety of ways, for example based on the components 152, 114, 156 shown in FIG. 4. In certain embodiments, the estimated application rate may be determined 150 based upon the actual depletion of a particular container, as indicated by signals from the level sensor 60 or the flow sensor 68. For example, as noted above, various operations may be executed in order to determine 126 an amount of material remaining in the material application system 30 (or a portion thereof). Further, various operations may be executed in order to determined 112 a reference quantity 114 of material in the material application system 30 (or a portion thereof). Also, various operations may be executed in order to determine 124 an indicator (e.g., time or distance) of current application duration 152. These factors may be utilized in order to determine 150, for a particular application operation, an estimated application rate. For example, the determined 126 material remaining may be subtracted from the determined 112 reference quantity 114 of material and divided by the determined 124 duration indicator in order to determine 150 an estimated application rate.

In certain implementations, the estimated application rate may be determined 150 with respect to the transfer box 32 (or other particular container). For example, upon the level sensor 60 indicating that the transfer box 32 may be substantially empty of material, the reference quantity 114 of material in the transfer box 32 (e.g., the weight of material in the transfer box 32 when the transfer box 32 is substantially full) may be divided by the determined 124 duration indicator in order to determine 150 an estimated application rate with respect to the transfer box 32.

In certain implementations, the determination 150 of an estimated application rate for the transfer box 32 may be further modified with respect to the capacity of the remainder of the material application system 30. For example, when the transfer box 32 is mounted to the base box 34, an amount of material may immediately flow from the transfer box 32 to the base box 34, such that the transfer box 32 may contain, at the start of application of material from the transfer box 32, only a fraction of its original weight of material. In certain implementations, this fraction of the original weight of material may be utilized, rather than the full original weight of material, in order to determine 150 an estimated application rate. For example, the transfer box 32 may have a capacity of 50 pounds and the base box 34 may have a capacity of 16 pounds. Accordingly, when the level sensor 60 indicates that the transfer box 32 is substantially empty, only approximately 34 pounds of material from the transfer box 32 may be have been applied by the material application system 30 (with the remaining 16 pounds still retained within the base box 34). Accordingly, the estimated application rate for the transfer box 32 may be determined 150 based upon dividing the 34 pounds of applied material by a determined 124 indicator of application duration corresponding to the time between mounting of the full transfer box 32 to the base box 34 and the signal from the level sensor 60 corresponding to the transfer box 32 being substantially empty. (It will be understood that a similar calculation may be executed where the base box 34 has a different initial capacity, such as when the base box 34 is not substantially empty when the transfer box 32 is mounted thereto.)

Once an estimated application rate has been determined 150, the estimated application rate may be compared 158 to the expected application rate 116. For example, the determined 150 estimated application rate may be subtracted from, divided by, other otherwise compared with the expected application rate 116 such that a percentage or absolute difference between the two rates may be determined. Where the determined difference exceeds a particular threshold (e.g., 3%), an update 160 of the expected application rate 116 may be appropriate, for continued operation of the material application system.

The updating 160 of the expected application rate may be useful for various reasons. For example, because the expected application rate 116 may be utilized for various functionality (e.g., determining 128 a remaining interval of application before replenishment of a container, as described above), it may be useful for the expected application rate 116 to closely represent the actual application rate for a particular operation. If the estimated application rate is determined 150 to deviate from the estimated application rate 116 by more than a threshold percentage (or absolute value), this may indicate that the actual flow rate of material out of the material application system 30 may not be appropriately represented by the previously determined expected application rate 116 and it may be appropriate to update 160 the expected application rate.

The expected application rate 116 may be updated 160 in a variety of ways. In certain implementations, the expected application rate 116 may simply be reset to equal the determined 150 estimated application rate. In certain implementations, the expected application rate 116 may be averaged (including with a weighted average) with the old expected application rate 116 in order to determine an new expected application rate 116 for ongoing operation. In certain implementations, a model may be provided (e.g., a lookup table, mathematical function, curve, and so on) for updating 160 the expected application rate 116 based upon the comparison 158 of the determined 150 estimated application rate and the old expected application rate 16.

In certain implementations, the expected application rate may be updated 160 based upon operator input. For example, when comparison 158 of estimated and expected application rates indicates an undesired deviation between estimated and expected application rates (or at other times), an indicator of the comparison 158 may be provided 162 to an operator. The operator may then, as desired, provide an operator input relating to the expected application rate, which may be received 164 (e.g., by the controller 42) and utilized in order to update 160 the expected application rate for the MM method 100. For example, upon receiving an indicator that the expected and estimated application rates are substantially different, an operator may undertake a manual calibration of the metering device 64, then provide an input instructing the controller 42 to utilize a particular expected application rate 116 (e.g., the old expected application rate 116, or a new expected application rate 116, as determined based upon the manual calibration) for continued operation.

In certain implementations, the rate of application of materials may itself be controlled 166 based upon the comparison 158 of the expected and estimated application rates. For example, where the comparison 158 of estimated and expected application rates indicates an unacceptable deviation between the determined 150 estimated application rate and the expected application rate 116, the metering device 64 may be controlled 166 in order to bring the actual application rate via the gate 66 (e.g., as reflected by the determined 150 estimated application rate) into closer alignment with the expected (e.g., target) application rate 116. For example, if the estimated application rate is determined 150 to be somewhat less than a target application rate for a particular material, the controller 42 may command the metering device 64 to open the gate 66 wider (or more often) in order to bring the actual application rate into alignment with the target application rate. It will be understood that, in other embodiments, other devices may be similarly controlled 166 in order to adjust the actual application rate of material It will be understood that various operations described above may be executed a single time, or may be executed multiple times, such as at regular intervals during an application operation. For example, the controller 42 may be configured to execute various of the operations (e.g., receive 102 relevant signals, determine 112 reference parameters, determine 124 current application duration, determine 128 remaining intervals, and so on) as part of a cyclical or otherwise repeated execution of the MM method 100. Similarly, various aspects of the MM method 100 may be executed iteratively, such that various determinations (e.g., the determined 126 amount of remaining material and the determined 128 remaining interval for application) may be re-made based upon updated information (e.g., updated 160 values for the expected application rate 116).

As will be appreciated by one skilled in the art, various aspects of the disclosed subject matter may be embodied as a computer-implemented method, a system, or a computer program product. Accordingly, certain implementations may be implemented entirely as hardware, entirely as software (including firmware, resident software, micro-code, and so on) or as a combination of software and hardware aspects. Furthermore, certain implementations may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain implementations are described herein with reference to flowchart illustrations and/or block diagrams of methods, apparatus (systems) and computer program products according to implementations of the disclosure. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which includes one or more executable instructions for implementing the specified logical function(s). Further, in some alternative implementations, the functions noted in the various blocks may occur out of the order noted in the figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An agricultural material application system configured to apply an agricultural material at a desired location in a field, the agricultural material application system comprising:
    a base container mounted to a frame of the agricultural material application system and defining a first capacity configured to store a first quantity of the material;
    a transfer container removably mounted to the base container and defining a second capacity configured to store a second quantity of the material greater than the first quantity of the material;
    a transfer passage located between the base container and the transfer container, the transfer passage configured to provide material flow from the transfer container into the base container to enable filling the base container to the first capacity, wherein the material provided by the transfer passage moves past the transfer passage into the base container to fill the base container to the first capacity;
    a metering device, wherein the metering device is associated with the base container, the metering device configured to adjust a flow of the material from the base container;
    a sensor disposed at one of the base container, the transfer container, and the transfer passage and configured to monitor one or more of a material level and a material flow for one of the base container and the transfer container;
    a display device; and
    a controller including a memory and a processing device operatively connected to the sensor, to the metering device, and to the memory, wherein the processing device is configured to execute program instructions stored in the memory to:
        receive a signal from the sensor corresponding to the one or more of the material level and the material flow;
        determine a reference quantity of the material contained by the agricultural material application system, an expected application rate for the material, and an indicator of current application duration that corresponds to an amount of time or a distance over which a current application operation has continued, wherein the reference quantity of the material, the expected application rate, and the indicator of current application duration collectively form a material application parameter set;
        determine, based upon one or more of the signal and the material application parameter set, an amount of material remaining for application;
        determine, based upon the amount of material remaining for application and the expected application rate, a remaining interval including one of: i) a time remaining, ii) a distance remaining, and iii) a coverage area, for application without a replenishment of the transfer container;
        provide an indicator of the remaining interval to an operator of the agricultural material application system at the display device;
        determine an estimated application rate based upon the indicator of current application duration, the reference quantity of the material, and the one or more of the material level and the material flow;
        compare the estimated and expected application rates; and
    further wherein the processing device is configured to control the metering device between open and closed positions to adjust a rate of application of the material based on the comparison of the estimated and expected application rates.

2. The agricultural material application system of claim 1, further comprising:
    a plurality of base containers mounted to the frame of the agricultural material application system, each of the plurality of base containers being configured to store the first quantity of the material;
    a plurality of transfer containers, each of the plurality of transfer containers being configured to be removably mounted to at least one of the plurality of base containers and each being configured to store the second quantity of the material greater than the first quantity of material;

a plurality of transfer passages, each of the plurality of transfer passages being located between one of the plurality of base containers and one of the plurality of transfer containers;

a plurality of metering devices, wherein each of the plurality of metering devices is associated with one of the plurality of base containers, each of the plurality of metering devices configured to adjust a flow of the material from the one of the plurality of base containers;

a plurality of sensors, each of the plurality of sensors disposed at one of the base container, the transfer container, and the transfer passage configured to monitor one or more of the material level and the material flow for each base or transfer container of the plurality of base and transfer containers;

wherein the processing device is further configured to execute stored program instructions to:
determine a plurality of remaining intervals for application without a replenishment of one of the plurality of transfer containers, each of the plurality of remaining intervals being associated with a corresponding one of the plurality of transfer containers; and cause the display device to display indicators of the plurality of remaining intervals for application to the operator.

3. The agricultural material application system of claim 2, wherein the processing device is further configured to execute stored program instructions to:
identify a first one or more of the plurality of transfer containers having a lower remaining interval for application than a second one or more of the plurality of transfer containers; and cause the display device to provide a current display of only a subset of the indicators of the plurality of remaining intervals of application, the subset corresponding to the first one or more of the plurality of transfer containers.

4. The agricultural material application system of claim 1, wherein the base container is configured to receive the material from the transfer container before application of the material outside the agricultural material application system and further comprising a plurality of sensors;
wherein, one of the plurality of sensors is configured to monitor the material level, the material level corresponds to a current material level for the transfer container; and
wherein, one of the plurality of sensors is configured to monitor the material flow, the material flow corresponds to one of a current material flow from the transfer container to the base container and a current material flow out of the base container.

5. The agricultural material application system of claim 1, further comprising a base mounting structure, wherein the transfer passage extends through the base mounting structure and wherein the transfer container is removably mounted to the base container at the base mounting structure, such that, during normal operation of the agricultural material application system, the transfer container is replenished when substantially empty of the material by removing the transfer container from the base mounting structure for replacement with a substitute transfer container that is substantially full of the material.

6. The agricultural material application system of claim 1, wherein, when the signal received by the processing device corresponds to one or more of a reduced material level, with respect to the reference quantity of the material, or a reduced material flow, the processing device is further configured to execute stored program instructions to execute a calibration operation including:
determining an estimated application rate based upon the indicator of current application duration, the reference quantity of the material, and the one or more of the reduced material level and the reduced material flow;
comparing the estimated and expected application rates; and
updating the expected application rate based upon the comparison of the estimated and expected application rates.

7. The agricultural material application system of claim 6, wherein updating the expected application rate includes:
providing an indicator of the comparison of the estimated and expected application rates to the operator; and
updating the expected application rate based upon receiving an operator input.

8. The agricultural material application system of claim 6, wherein one or more of the reduced material level and the reduced material flow corresponds to the transfer container being substantially empty of the material.

9. The agricultural material application system of claim 8, wherein the processing device is further configured to execute stored program instructions to:
determine, based upon the signal, that the transfer container is substantially empty of the material; and
indicate to the operator that the transfer container is substantially empty of the material.

10. The agricultural material application system of claim 9, wherein the processing device is further configured execute stored program instructions to determine that the transfer container is substantially empty of the material based upon the remaining interval for application.

11. An agricultural material application system configured to apply agricultural material in a field, the agricultural material application system comprising:
a plurality of base containers, each of the plurality of base containers being mounted to a frame and defining a first capacity configured to store a first quantity of the material;
a plurality of transfer containers, each of the plurality of transfer containers being removably mounted to one of the plurality of base containers and each of the plurality of transfer containers defining a second capacity configured to store a second quantity of the material greater than the first quantity of the material;
a plurality of transfer passages, each of the plurality of transfer passages being located between one of the plurality of base containers and one of the plurality of transfer containers such that each transfer passage of the plurality of transfer passages couples an associated base container and transfer container to one another, wherein each of the transfer passages is configured to provide material flow between one of the plurality of transfer containers and the associated base container included in the plurality of base containers to enable filling the associated base container to the first capacity, and wherein the material provided by each of the transfer passages moves past a transfer passage included in the plurality of transfer passages to fill at least one base container included in the plurality of base containers to the first capacity;

a plurality of level sensors, each of the plurality of level sensors, respectively, being disposed at one of the plurality of base containers, one of the plurality of transfer containers, or one of the plurality of transfer passages, and being configured to monitor a material level for one of the plurality of base containers and one of the plurality of transfer containers;

a plurality of flow sensors, each of the plurality of flow sensors being disposed at an outlet of one of the plurality of base containers and being configured to monitor a material flow at the outlet of one of the plurality of base containers;

a display device;

a memory; and a processing device operatively connected to at least one of: (a) a level sensor included in the plurality level sensors and (b) a flow sensor included in the plurality of flow sensors, the display device, and the memory, wherein the processing device is configured to execute program instructions stored in the memory to:

receive a level sensor signal from at least one of the plurality of level sensors corresponding to a reduced material level of at least one of: (a) a base container included in the plurality of base containers or (b) a transfer container included in the plurality of transfer containers;

receive a flow sensor signal from at least one of the plurality of flow sensors corresponding to a reduced material flow at the outlet of one of the plurality of base containers;

in response to receiving at least one of (a) the level sensor signal corresponding to a reduced material level and (b) the flow sensor signal corresponding to a reduced material flow:

(i) determine an estimated application rate based upon an indicator of current application duration that corresponds to an amount of time or a distance over which a current application operation has continued, a reference quantity of the material, and one or both of the level sensor signal from the at least one of the plurality of level sensors and the flow sensor signal from the at least one of the plurality of flow sensors, (ii) compare the estimated application rate and an expected application rate, and (iii) update the expected application rate based upon the comparison of the estimated and expected application rates.

12. The agricultural material application system of claim 11, wherein updating the expected application rate includes:

providing an indicator of the comparison of the estimated and expected application rates to the display device for display to an operator; and updating the expected application rate based upon receiving an operator input.

13. The agricultural material application system of claim 11, wherein the processing device is further configured to execute stored program instructions to:

determine, based upon the level sensor signal from the at least one of the plurality of level sensors and the flow sensor signal from the at least one of the plurality of flow sensors, that one or more of the plurality of transfer containers is substantially empty of material; and indicate to an operator with an indicator at the display device that one or more the transfer containers is substantially empty of material.

14. The agricultural material application system of claim 11, wherein the processing device is further configured to execute stored program instructions to:

determine an amount of the material remaining for application, based upon one or more of the level sensor signals, the flow sensor signals, and a material application parameter set that includes the reference quantity of the material contained by the transfer containers, the expected application rate for the material, and the indicator of current application duration;

determine, based upon the amount of material remaining for application and the expected application rate, a remaining interval for application without a replenishment of one or more of the transfer containers; and provide an indicator on the display device of the remaining interval for application to an operator of the agricultural material application system.

15. The agricultural material application system of claim 11, wherein the processing device is further configured to execute stored program instructions to:

cause the display device to display indicators of the plurality of remaining intervals for application to an operator, wherein the remaining interval is further based on a coverage area determined by a distance interval.

16. The agricultural material application system of claim 15, wherein the processing device is further configured to execute stored program instructions to:

identify a first associated base and transfer container having a lower corresponding remaining interval for application than a second associated base and transfer container; and cause the display device to provide a current display of only a subset of the indicators of the plurality of remaining intervals of application, the subset corresponding to the associated base container or transfer containers.

17. The agricultural material application system of claim 11, wherein each of the plurality of base containers is configured to receive the material from the associated transfer container mounted thereto before application of the material outside the agricultural material application system;

wherein, the material level configured to be monitored by at least of one of the plurality of level sensors corresponds to a current material level for at least one of the plurality of transfer containers; and wherein, the material flow configured to be monitored by at least one of the plurality of flow sensors corresponds to one of a current material flow from at least one of the plurality of transfer containers to the associated base container and a current material flow out of the associated base container.

18. The agricultural material application system of claim 11, wherein each of the plurality of transfer containers is removably mounted to a base mounting structure, such that, during normal operation of the agricultural material application system, each transfer container of the plurality of transfer containers is replenished when substantially empty of material by removing an empty transfer container included in the plurality of transfer containers from the base mounting structure for replacement with a substitute transfer container included in the plurality of transfer containers that is substantially full of material.

\* \* \* \* \*